United States Patent
Lautzenheiser et al.

(10) Patent No.: US 8,375,970 B2
(45) Date of Patent: *Feb. 19, 2013

(54) VALVE SYSTEM

(75) Inventors: Terry L. Lautzenheiser, Nunica, MI (US); David O. Godfrey, Lowell, MI (US); Michael E. Miles, Grand Rapids, MI (US); Steve O. Mork, Lowell, MI (US); Richard B. Bylsma, Ada, MI (US)

(73) Assignee: Access Business Group International LLC, Ada, MI (US)

( * ) Notice: Subject to any disclaimer, the term of this patent is extended or adjusted under 35 U.S.C. 154(b) by 403 days.

This patent is subject to a terminal disclaimer.

(21) Appl. No.: 12/706,181

(22) Filed: Feb. 16, 2010

(65) Prior Publication Data

US 2010/0139779 A1 Jun. 10, 2010

Related U.S. Application Data

(63) Continuation-in-part of application No. 12/613,565, filed on Nov. 6, 2009.

(60) Provisional application No. 61/113,108, filed on Nov. 10, 2008.

(51) Int. Cl.
- G05D 11/00 (2006.01)
- F16K 13/14 (2006.01)
- F16K 11/20 (2006.01)
- F16L 37/56 (2006.01)

(52) U.S. Cl. ....... 137/12; 137/87.01; 137/495; 137/594; 137/597

(58) Field of Classification Search .......... 137/110, 137/599.14, 599.15, 599.11, 87.01, 78.1, 137/495, 487.5, 505.14, 87.04, 544, 597, 137/594, 505.21, 505.22, 505.38, 12

See application file for complete search history.

(56) References Cited

U.S. PATENT DOCUMENTS 2,371,720 A * 3/1945 Stine .............................. 422/266
2,588,186 A * 3/1952 Wasson .......................... 137/66

(Continued)

FOREIGN PATENT DOCUMENTS

| CH | 547457 | 3/1974 |
|----|--------|--------|
| DE | 3322068 | 12/1984 |

(Continued)

OTHER PUBLICATIONS

International Search Report and Written Opinion, Feb. 5, 2010.

(Continued)

*Primary Examiner* — Stephen M Hepperle
*Assistant Examiner* — Kevin Barss
(74) *Attorney, Agent, or Firm* — Warner Norcross & Judd LLP

(57) ABSTRACT

A valve system enables use of a standard single line faucet with a water treatment system, protects water treatment systems and other fluid flow devices from unnecessary fluid pressure, and regulates or prevents fluid flow to a dispenser or outlet in response to a particular event, such as a leak. The valve system includes a housing having ports for: (1) receiving a supply fluid, (2) supplying the fluid to a device, such as a water treatment system, (3) receiving the fluid from the device and (4) supplying fluid to a dispenser. The valve system also includes an automatic shutoff device within the housing that prevents water from flowing into the housing and the water treatment system when the dispensing outlet is closed and that allows water to flow through the housing and into the water treatment system when the outlet is open. The valve system may also include a second actuator connected to the automatic shutoff that is capable of moving the automatic shutoff to a partially or fully closed position.

19 Claims, 13 Drawing Sheets

U.S. PATENT DOCUMENTS

| | | | |
|---|---|---|---|
| 3,191,628 A * | 6/1965 | Kirkwood et al. | 137/625.43 |
| 3,683,961 A | 8/1972 | Launay et al. | |
| 4,021,343 A | 5/1977 | Tyler | |
| 4,058,287 A | 11/1977 | Fromfield | |
| 4,105,555 A * | 8/1978 | Pease | 210/136 |
| 4,176,063 A * | 11/1979 | Tyler | 210/101 |
| 4,361,170 A * | 11/1982 | Peloza | 137/625.29 |
| 4,391,712 A | 7/1983 | Tyler et al. | |
| 4,405,000 A | 9/1983 | Fuller | |
| 4,431,019 A * | 2/1984 | Kopp et al. | 137/87.04 |
| 4,535,797 A * | 8/1985 | Rosaen | 137/87.03 |
| 4,604,194 A | 8/1986 | Entingh | |
| 4,619,436 A | 10/1986 | Bonzer | |
| 4,808,302 A | 2/1989 | Beall, Jr. | |
| 4,885,085 A | 12/1989 | Beall, Jr. | |
| 5,002,664 A | 3/1991 | Clack et al. | |
| 5,057,214 A * | 10/1991 | Morris | 210/136 |
| 5,096,574 A | 3/1992 | Birdsong et al. | |
| 5,128,035 A | 7/1992 | Clack et al. | |
| 5,131,277 A | 7/1992 | Birdsong et al. | |
| 5,132,017 A | 7/1992 | Birdsong et al. | |
| 5,173,178 A | 12/1992 | Kawashima et al. | |
| 5,275,193 A | 1/1994 | Wright | |
| 5,460,716 A | 10/1995 | Wolbers | |
| RE35,252 E | 5/1996 | Clack et al. | |
| 5,515,884 A | 5/1996 | Danzy et al. | |
| 5,662,793 A | 9/1997 | Beall, Jr. | |
| 5,937,903 A * | 8/1999 | Afshar et al. | 137/625.46 |
| 5,996,606 A * | 12/1999 | Iwasaki et al. | 137/110 |
| 6,007,710 A | 12/1999 | Pavel | |
| 6,085,788 A | 7/2000 | Larson et al. | |
| 6,109,288 A * | 8/2000 | Al-Hamlan | 137/87.01 |
| 6,186,174 B1 * | 2/2001 | Yurchision et al. | 137/625.46 |
| 6,214,214 B1 | 4/2001 | Hansen et al. | |
| 6,347,644 B1 * | 2/2002 | Channell | 137/597 |
| 6,428,689 B1 * | 8/2002 | Kameyama et al. | 210/120 |
| 6,436,282 B1 | 8/2002 | Gundrum et al. | |
| 6,568,428 B2 * | 5/2003 | Pecci et al. | 137/597 |
| 6,797,156 B2 | 9/2004 | Chau | |
| 7,017,611 B2 | 3/2006 | Schmitt | |
| 7,182,857 B2 | 2/2007 | Koslow et al. | |
| 7,264,731 B2 | 9/2007 | Bosko | |
| 7,267,769 B2 | 9/2007 | Baird | |
| 7,285,210 B2 | 10/2007 | Schmitt | |
| 7,296,585 B2 | 11/2007 | Eggleston et al. | |
| 7,303,666 B1 | 12/2007 | Mitsis | |
| 7,316,774 B2 | 1/2008 | Halemba et al. | |
| 7,402,240 B2 | 7/2008 | King et al. | |
| 2003/0066340 A1 * | 4/2003 | Hassenflug | 73/46 |
| 2003/0183275 A1 * | 10/2003 | Yang | 137/98 |
| 2004/0129617 A1 * | 7/2004 | Tanner et al. | 210/110 |
| 2004/0161227 A1 * | 8/2004 | Baxter | 392/454 |
| 2004/0182455 A1 * | 9/2004 | Wells et al. | 137/594 |
| 2004/0206405 A1 * | 10/2004 | Smith et al. | 137/624.12 |
| 2004/0217068 A1 | 11/2004 | Kirby | |
| 2005/0087492 A1 | 4/2005 | Schmitt | |
| 2005/0115875 A1 | 6/2005 | Schmitt | |
| 2005/0173317 A1 | 8/2005 | Schmitt | |
| 2006/0000761 A1 | 1/2006 | Choi et al. | |
| 2006/0113240 A1 | 6/2006 | Burrows et al. | |
| 2007/0074772 A1 | 4/2007 | Yang et al. | |
| 2007/0181191 A1 | 8/2007 | Wittig et al. | |
| 2007/0256977 A1 | 11/2007 | Schmitt | |
| 2007/0262004 A1 | 11/2007 | Jordan et al. | |
| 2007/0284245 A1 * | 12/2007 | Hegel et al. | 204/280 |
| 2008/0011365 A1 * | 1/2008 | Newton et al. | 137/540 |
| 2008/0052094 A1 * | 2/2008 | Morfopoulos et al. | 705/1 |

FOREIGN PATENT DOCUMENTS

| | | |
|---|---|---|
| DE | 4031764 | 2/1992 |
| DE | 20013926 | 10/2000 |
| EP | 0796953 | 9/1997 |
| EP | 0803473 | 10/1997 |
| EP | 0898022 | 2/1999 |
| EP | 1757354 | 2/2007 |
| FR | 2441116 | 6/1980 |
| JP | 2107872 | 4/1990 |
| JP | 4025682 | 1/1992 |
| JP | 2004/069039 | 3/2004 |
| KR | 2005017786 | 2/2005 |
| WO | 00/43703 | 7/2000 |

OTHER PUBLICATIONS

International Preliminary Report on Patentability Chapter I (IB/373) including the Written Opinion of the International Search Authority for PCT/US2009/063464, May 10, 2011.

International Search Report and Written Opinion for PCT/US2011/024704, Aug. 4, 2011.

English Abstract of KR 2005017786A.

* cited by examiner

VALVE SYSTEM

BACKGROUND OF THE INVENTION

The present invention is directed to valve systems, and more particularly to a valve system for regulating flow and pressure in water treatment systems and other fluid flow systems.

Water treatment systems are well known for providing filtered, treated water. These systems typically include an inlet for receiving untreated water from a supply line, one or more filters for treating the water, and an outlet for the treated water. The treated water outlet may be connected to a outlet, such as a faucet, that can be opened (i.e. "turned on") to dispense the treated water. Currently, many water treatment systems can only be used with a "three-line" faucet that includes a first line for untreated water supply to the water treatment system, a second line that receives the treated water from the system, and a third line that receives untreated water from a supply source. This configuration serves to limit pressure on the water treatment system when 'waiting' to dispense water, because the water treatment system only experiences pressure when the valve on the faucet is open. Unfortunately, there are only a limited number of styles and options for three-line faucets, creating a need for a system that enables the use of a standard single-line faucet for dispensing treated water from a water treatment system while limiting the pressure on the system.

In addition to water treatment systems, a variety of other fluid flow systems, such as hot water heaters, beverage vending machines, and hydraulic and pneumatic cylinder systems suffer from disadvantages associated with the constant fluid pressure on the system. The high fluid pressure experienced by many of these systems places a strain on the connectors, housings, and other system components, and can make it difficult to conduct maintenance on the system without shutting off the fluid source at a separate, and sometimes remote, location. Even greater problems are caused when this high pressure causes the water treatment system or another type of fluid flow system to fail, causing the fluid to leak continuously until it is detected and can be shut off at its source.

SUMMARY OF THE INVENTION

The present invention provides a valve system that may: (1) enable use of a standard single line faucet with a low pressure water treatment system; (2) protect water treatment systems and other fluid flow devices from unnecessary fluid pressure, (3) remove pressure from the water treatment system and other fluid flow devices, (4) regulate or prevent fluid flow to the dispenser or outlet in response to a particular event, such as a leak and (5) cap the general fluid flow through the system.

In one embodiment, the valve system includes a housing having ports for: (1) receiving a supply fluid, (2) supplying the fluid to a device, such as a water treatment system, (3) receiving the fluid from the device and (4) supplying fluid to a dispenser (i.e. a single line faucet or another type of outlet). The valve system includes an automatic shutoff device within the housing that prevents water from flowing into the housing and the water treatment system when the dispensing outlet is closed and that allows water to flow through the housing and into the water treatment system when the outlet is open. The automatic shutoff may operate on a pressure differential between the incoming supply water and the outflow of treated water. In one embodiment, the automatic shutoff includes a moveable element, such as a plunger, that moves between a first position in which the valve is open and a second position in which the valve is closed. The moveable element may be configured to move as a function of the pressure differential between the fluid flowing over an upper surface of the moveable element and the fluid flowing over the lower surface of the moveable element.

In one embodiment, the valve system further includes a pressure relief mechanism that removes pressure from the water treatment system (or other device) when the dispensing outlet is closed. In this embodiment, the valve system may also include a check valve for maintaining a desired amount of pressure within the housing for holding the automatic shutoff valve closed. The valve system may additionally include a flow controller for controlling the amount of fluid that flows into the valve system and into the water treatment system.

In another embodiment, the valve system includes a second actuator connected to the automatic shutoff. The second actuator is capable of moving the moveable element to the closed position regardless of the pressure differential on the automatic shutoff. In this way, the second actuator may act independently from the ordinary actuation of the automatic shutoff to force the valve system partially or completely closed. The second actuator may be manual or automatically operated, and in one embodiment the second actuator may be connected to one or more sensors that signal the second actuator to close upon the occurrence of a particular event. The second actuator may be in the form of a threaded shaft extending into the valve system housing. When the shaft is driven into the valve system, it causes the moveable element to move at least partially toward the closed position, which restricts or completely prevent flow through the valve system.

The valve system of the present invention provides a reliable device that can be inserted in-line with a water treatment system to allow use of a standard single-line outlet with the water treatment system while allowing the system to rest at low pressure. The valve system is also capable of providing pressure protection for water treatment systems and a wide variety of other fluid dispensing systems by preventing fluid flow to these devices when the dispensing outlet is closed. Such devices may include hot water heaters, beverage vending machines, drinking fountains, water softeners, refrigerator ice/water dispensers, dairy processors, food processing systems, air compressors, and hydraulic systems. The valve system enables easy maintenance of these devices by removing pressure from the device (and removing fluid flow to the device) when the dispensing outlet is turned off. Additionally, the internal components of any dispensing devices using the valve system may be lighter, smaller, and thus less expensive as they no longer have to withstand constant high pressure.

In the embodiment including a second actuator, the valve system can provide pressure protection for a variety of fluid flow devices along with additional functionality, such as system shutoff upon leak detection and flow regulation. This embodiment can be useful in many of the fluid flow applications noted above, for instance, by configuring the second actuator to shut off the fluid flow to the devices upon the detection of an undesirable event, such as a leak in the system. It can also be useful in regulating the amount of fluid that flows to a particular device, such as a gas gill, dish washer or washing machine.

DETAILED DESCRIPTION OF THE CURRENT EMBODIMENTS

Figure 1:
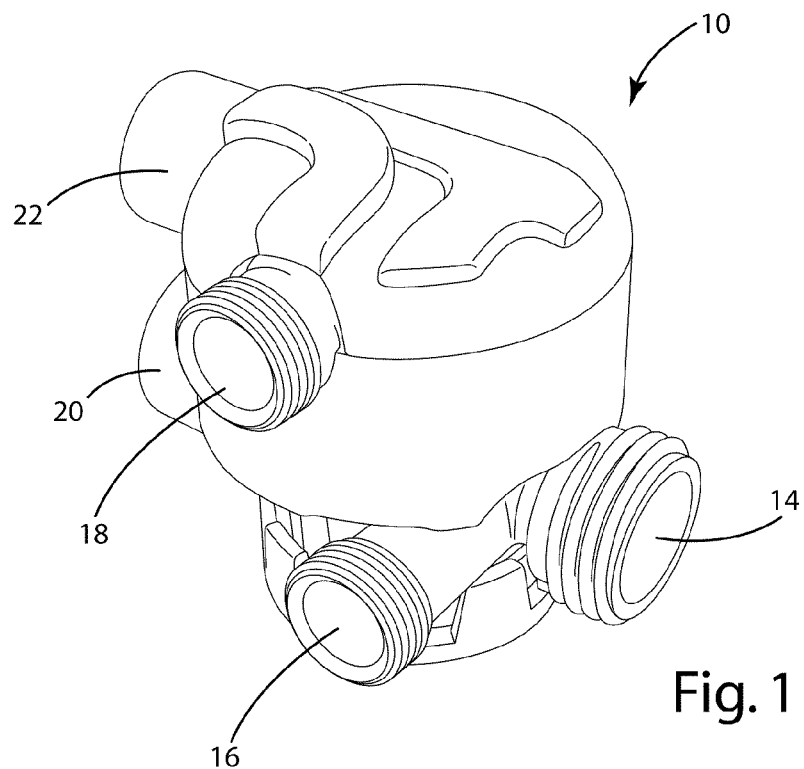
FIG. 1 is a perspective view of the valve system according to one embodiment.
Figure 2:
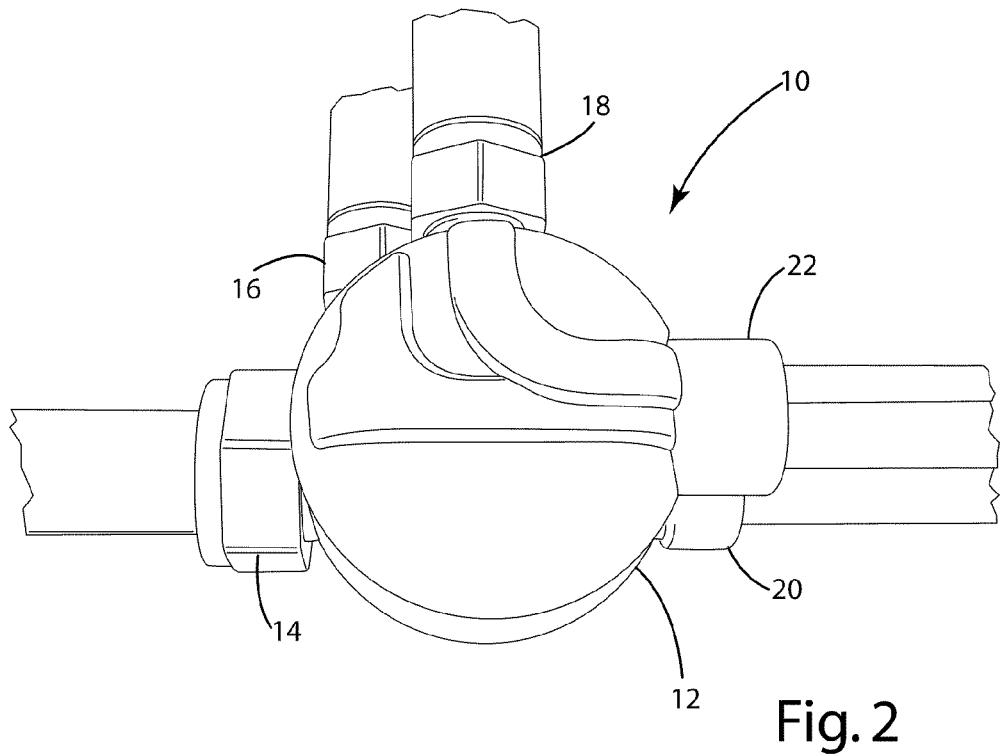
FIG. 2 is a top view of the valve system showing the supply lines connected to the valve system.
Figure 3:
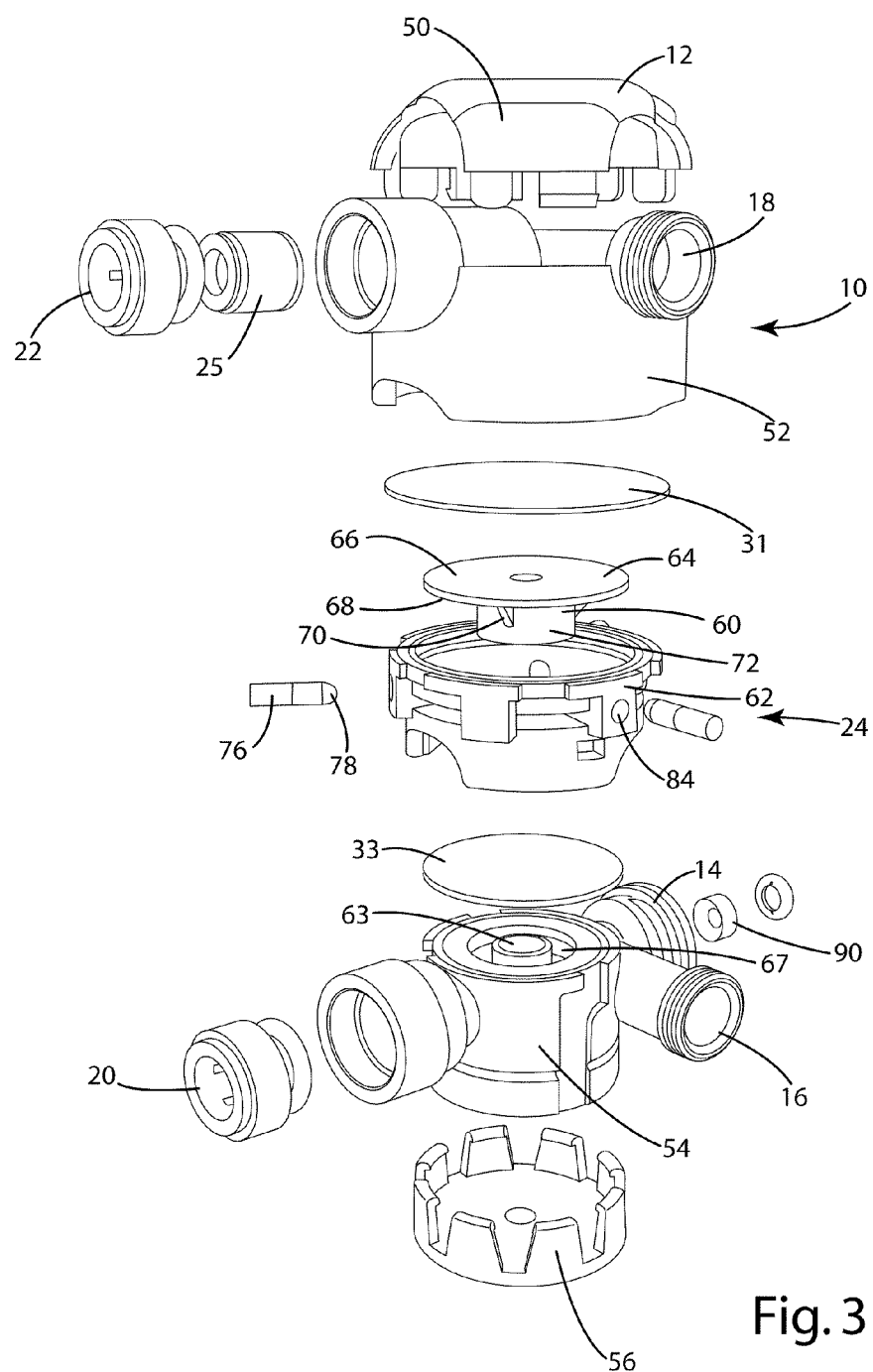
FIG. 3 is an exploded view of the valve system of FIG. 1.

A valve system according to one embodiment of the present invention is shown in FIGS. 1-3 and generally designated 10. The valve system 10 is configured to be used in a variety of applications. In one application, the valve system 10 enables use of a standard single line faucet with a water treatment system. In another application, the valve system 10 protects a fluid dispensing device, such as a water treatment system, a hot water tank, or a beverage vending machine from unwanted pressure.

The valve system 10 typically includes a plurality of ports for connecting the valve system 10 to the supply water, the faucet, and a down stream device, such as a water treatment system 11. As illustrated, the valve system 10 includes a housing 12 that has a supply water inlet port 14, an untreated water outlet port 16, a treated water outlet port 18, a water treatment system outlet port 20 and a water treatment system inlet port 22. An automatic shutoff valve 24 is positioned within the housing in fluid communication with the supply water inlet port 14, the treated water outlet port 18, and the water treatment system inlet and outlet ports 20, 22. In one embodiment, the automatic shutoff valve operates on a pressure differential between the supply water inlet 14 and the treated water outlet 18, such that the automatic shutoff allows water to flow through the water treatment system 11 when the supply water is turned on and prevents water from flowing through the water treatment system 11 when the supply water is off. A check valve 25 is positioned within the housing between the water treatment system inlet port 22 and the automatic shutoff 24.

The housing 12 may be formed from a variety of materials, and may include multiple pieces that are interfitted together. In one embodiment, the housing is formed from injection molded plastic, and includes an upper cap 50, an upper body member 52, a lower body member 54 and a bottom cap 56. As shown, the ports are molded integrally with the upper and lower body members, but this is not necessary.

Figure 5:
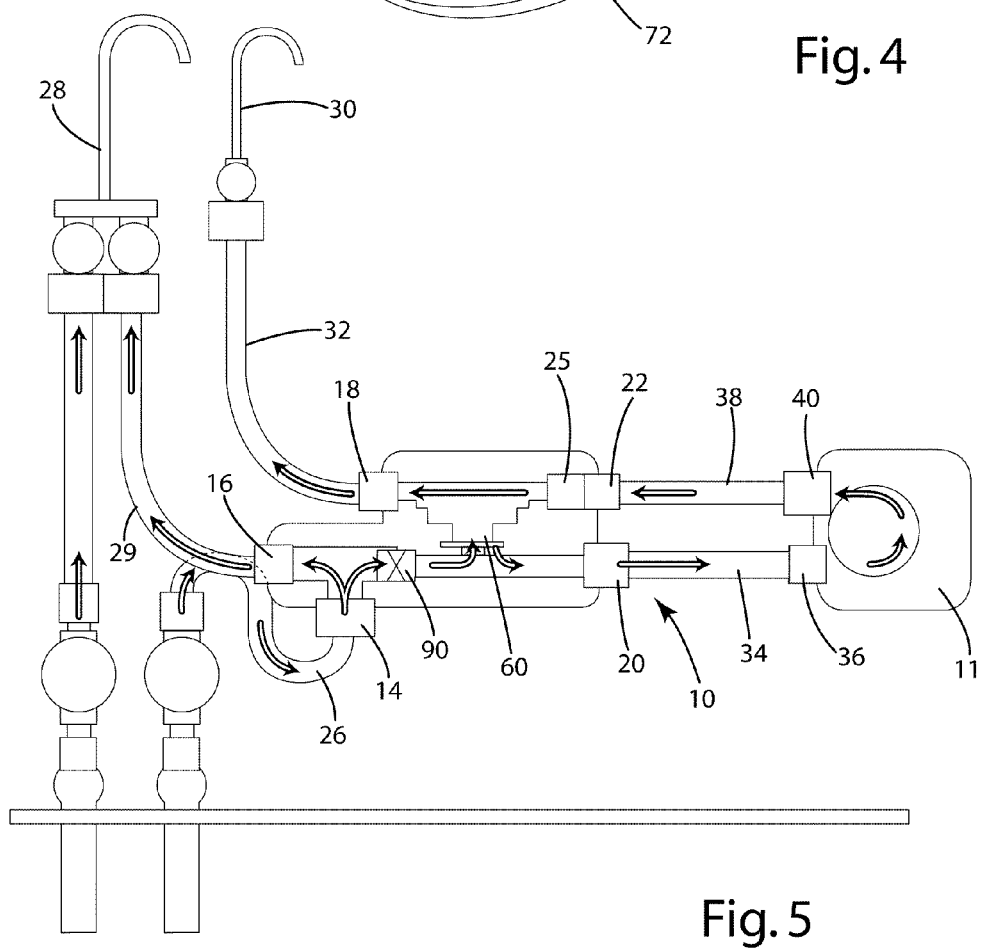
FIG. 5 is a schematic flow diagram showing the fluid flow through the valve system.

FIG. 5 shows the connections between the valve system 10, a first faucet 28 dispensing untreated water and a second faucet 30 that supplies treated water from the water treatment system 11. In the illustrated embodiment, the valve system 10 incorporates an untreated water outlet port 16 in order to facilitate an easy connection to the water supply line 26 by reducing the number of parts that will need to be installed. In this embodiment, the supply line 26 is connected to the supply water inlet port 14, and an untreated water supply line 29 is connected between the untreated water outlet port 16 and the faucet 28. The faucet 28 operates to dispense untreated water in the same manner as it did before the valve system 10 was connected. In another embodiment, the untreated water outlet 16 may not be included on the valve system 10. For instance, a separate, conventional pipe fitting "T" may be connected to the supply line 26, to split the supply water between the untreated faucet 28 and the valve system 10. A treated water supply line 32 is connected between the treated water outlet port 18 and the treated water faucet 30. A water treatment system inlet line 34 is connected between the valve system outlet port 20 and the inlet 36 of the water treatment system, and a water treatment system outlet line 38 is connected between the outlet 40 of the water treatment system and the water treatment system inlet port 22. In the illustrated embodiment, the supply water inlet port 14 is a ½ inch diameter threaded pipe connector, the untreated 16 and treated 18 water outlet ports are ⅜ inch diameter threaded pipe connectors, the valve system outlet port 20 is a ⅜ inch John Guest connector and the water treatment system inlet port 22 is a 5/16 inch John Guest connector. In another embodiment any of the ports on the valve system 10 could be a variety of other sizes and connector types depending on the desired application.

In one embodiment, the automatic shutoff valve 24 and the check valve are contained within the housing 12. The check valve 25 may be a conventional check valve that prevents fluid flow in one direction. In the illustrated embodiment, the check valve 25 is positioned near the water treatment system inlet port 22 to prevent fluid from flowing through the water treatment system inlet port 22 to the water treatment system 11. The automatic shutoff valve 24 is positioned within the housing 12 in fluid communication with the supply water inlet port 14, the treated water outlet port 18 and the water treatment system inlet and outlet ports 20, 22. As illustrated in FIG. 3, the automatic shutoff generally includes a plunger 60 supported within a plunger ring 62. The plunger 60 includes a plate 64, having an upper surface 66 and a lower surface 68, and a base 70 extending from the plate 64. In the illustrated embodiment, the plate 64 is circular in shape, and the base 70 has a generally cylindrical sidewall 72. The plunger 60 is mounted within the plunger ring 62 such that it is movable between an open position in which the plate 64 is shifted toward the upper body member 52 with a gap between the base 70 and the lower body member, and a closed position in which the base 70 contacts the lower body member 54. In the open position, the automatic shutoff 24 allows water (or another fluid) to flow from the supply line, through the gap between the base 70 and the lower body member 54, out the valve system outlet port 20, through the water treatment system 11, and then back into the valve system through the valve system inlet port 22, out the treated water outlet port 18 and ultimately out the treated water faucet 30. In the closed position, the automatic shutoff 24 prevents water (or another fluid) from entering the valve system 10 by blocking the hole 63 that provides fluid flow from the supply port 14 into the valve system 10. In one embodiment, the automatic shutoff 24 includes an upper membrane 31 between the plunger 60 and the upper body member 52 and a lower membrane 33 between the base 70 of the plunger 60 and the lower body member 54. In this embodiment, the fluid flows between the membranes and the upper 52 and lower 54 body members, such that the membranes 31, 33 act to seal the plunger 60 from the fluid. As noted above, the automatic shutoff 24 operates on a pressure differential between the fluid passing under the plunger and the fluid passing over the plunger. When the faucet 30 is turned off, the check valve 25 holds pressure within the valve system above the plunger 60, forcing the plunger 60 into the closed position. When the faucet 30 is turned on, the pressure above the plunger 60 is reduced, such that the plunger 60 moves toward the upper body member 52 and into the open position, allowing fluid to flow through the valve system 10 and into the water treatment system 11. As shown in FIGS. 3 and 5, when the plunger 60 moves into the open position, fluid flows from the supply inlet port 14 through the hole 63 defined in the upper surface 65 of the lower body member 54, and into the trough 67, which is in fluid communication with the water treatment system outlet port 20. As the fluid flows through the hole 63, it engages the lower membrane 33, which pushes the plunger 60 into the open position. In the illustrated embodiment, the pressure differential required to open and close the plunger 60 may be varied as desired by changing the relative diameters of the plate 64 and the base 70. In an alternative embodiment, a different automatic shutoff system may be used for controlling the fluid flow into and out of the valve system 10.

Figure 4:
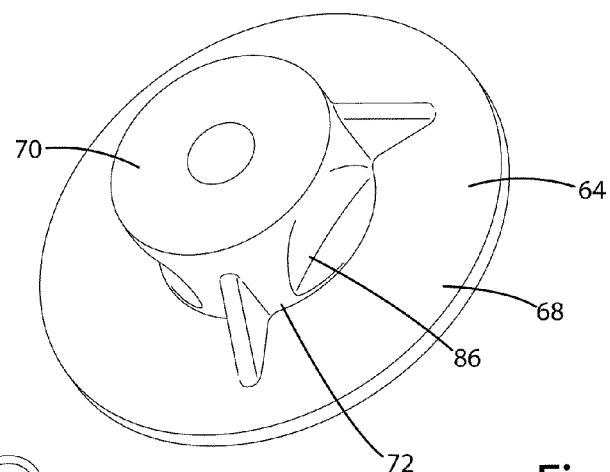
FIG. 4 is a perspective view of the plunger according to one embodiment.

In one embodiment, the automatic shutoff 24 includes a system for preventing the plunger 60 from "chatter." Chatter may arise in situations where the pressure above or below the plunger 60 changes slowly, such that the pressure remains for a period of time at about the level that will move the plunger 60 to the open position. This causes the plunger 60 to make sudden movements back and forth between the open and closed position, which can be loud and irritating and can cause the faucet 30 to drip. In the case of the present invention, a chatter situation can be created when the faucet 30 is closed, as the pressure gradually builds up on the upper surface of the plunger 60. In order to prevent chatter, the valve system 10 may include a device for mechanically holding the plunger 60 in the closed position until a significant amount of pressure is introduced to move it to the open position. As shown in FIGS. 3 and 4, in the illustrated embodiment, the valve system 10 includes a series of pins 76 containing spring loaded balls 78 that extend through holes 84 in the plunger ring 62 and fit into detents 86 in the sidewall 72 of the plunger base 70. As shown in FIG. 4, the detents 86 may have a ramped surface that biases the plunger 60 in the closed position. In this embodiment, the force on the base 70 of the plunger must overcome the force of the pressure on the plate 64, as well as the force of the spring loaded balls 78, before the plunger 60 will move to the open position. In an alternative embodiment, a different mechanical or electro-mechanical device may be used to bias the plunger 60 in either the open or closed position.

In one embodiment, the present invention additionally includes a flow controller 90 for limiting the flow of fluid entering the valve system 10, and, ultimately, for limiting the flow of fluid entering the water treatment system 11. This can ensure that the water treatment system 11 is operating to treat a desired amount of fluid—or no more than a maximum amount of fluid—at any given time. In one embodiment, the flow controller 90 is a flexible ring of material positioned proximate to the supply water inlet port 14. Other types of known flow controllers may otherwise be used.

Figure 6:
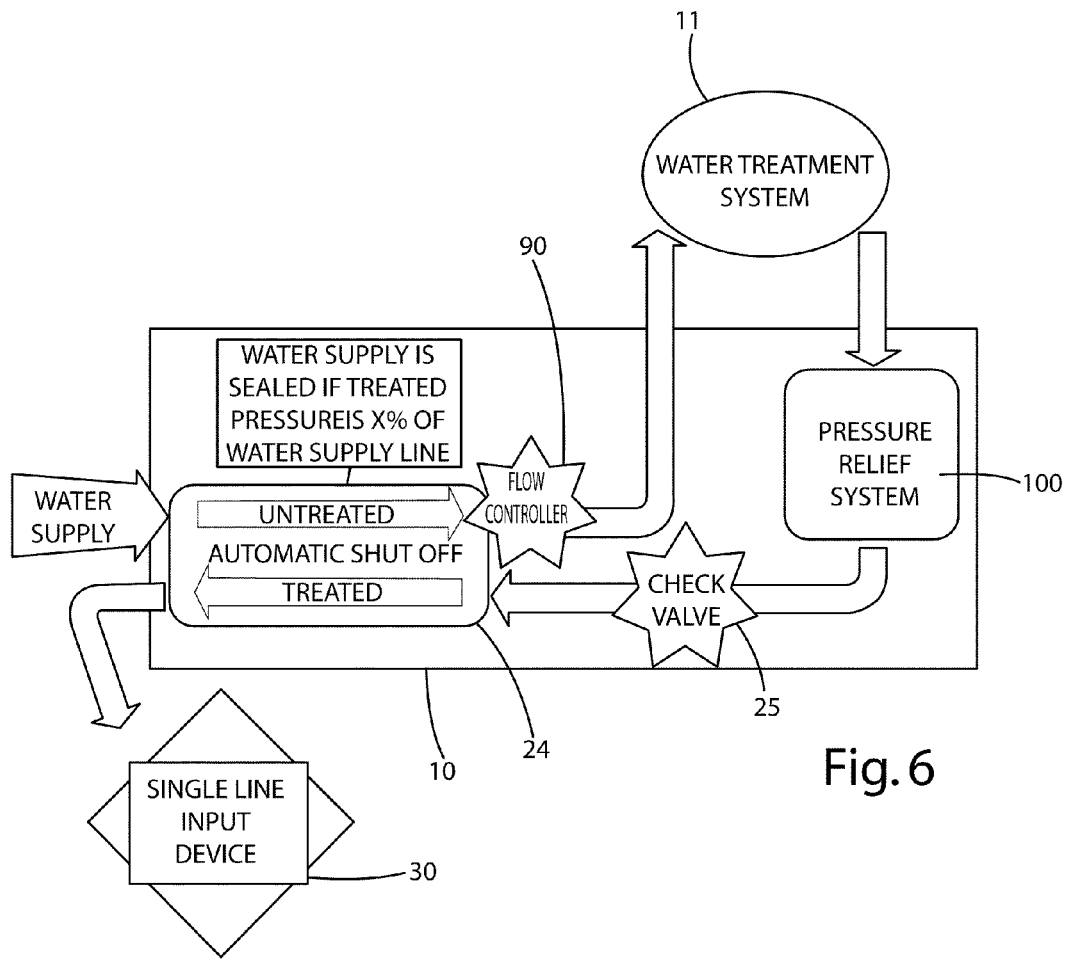
FIG. 6 is a schematic flow diagram of one embodiment of the present invention.

In another embodiment, shown in the schematic flow diagram in FIG. 6, the valve system 10 additionally includes a pressure relief mechanism 100 for relieving pressure on the water treatment system 11 when the automatic shutoff valve 24 is closed. In one embodiment, the pressure relief system 100 may be a check valve in the valve system 10, positioned between the water treatment system 11 and the check valve 25 that allows air to exit the system. In another embodiment, the pressure relief system may be an active system, such as a reservoir that uses a venturi to actively transfer pressure from the water treatment system 11 into the reservoir when the automatic shutoff 24 is closed. The pressure relief system 100 allows the water treatment system 11 to be pressure free at all times when the faucet 30 is closed, which can be especially helpful because it enables maintenance of the water treatment system 11 without the need for taking the system 11 off-line. This may be necessary in situations where the automatic shutoff 24 cannot close fast enough to keep pressure off the water treatment system 11. The pressure relief system 100 is not necessary in cases when the automatic shutoff 24 can close fast enough to prevent such pressure (such as in the first illustrated embodiment).

Figure 7:
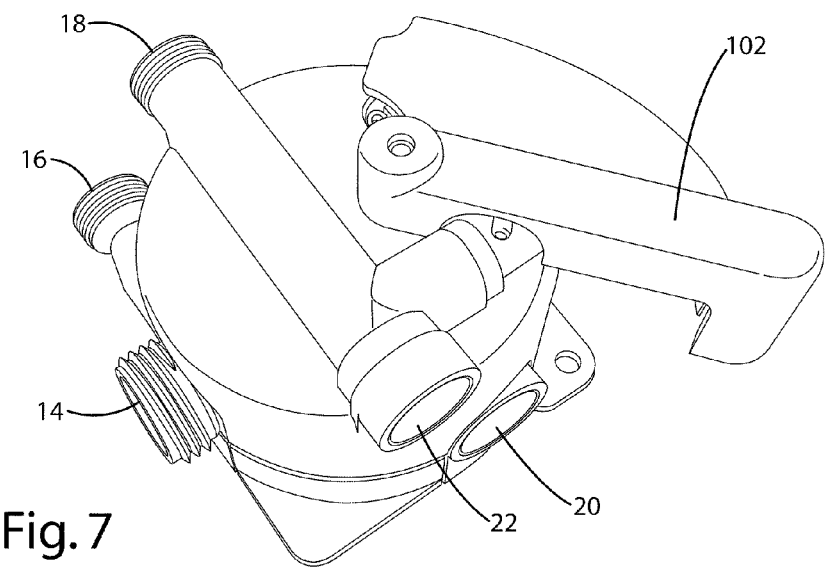
FIG. 7 is a perspective view of the valve system according to another embodiment.
Figure 8:
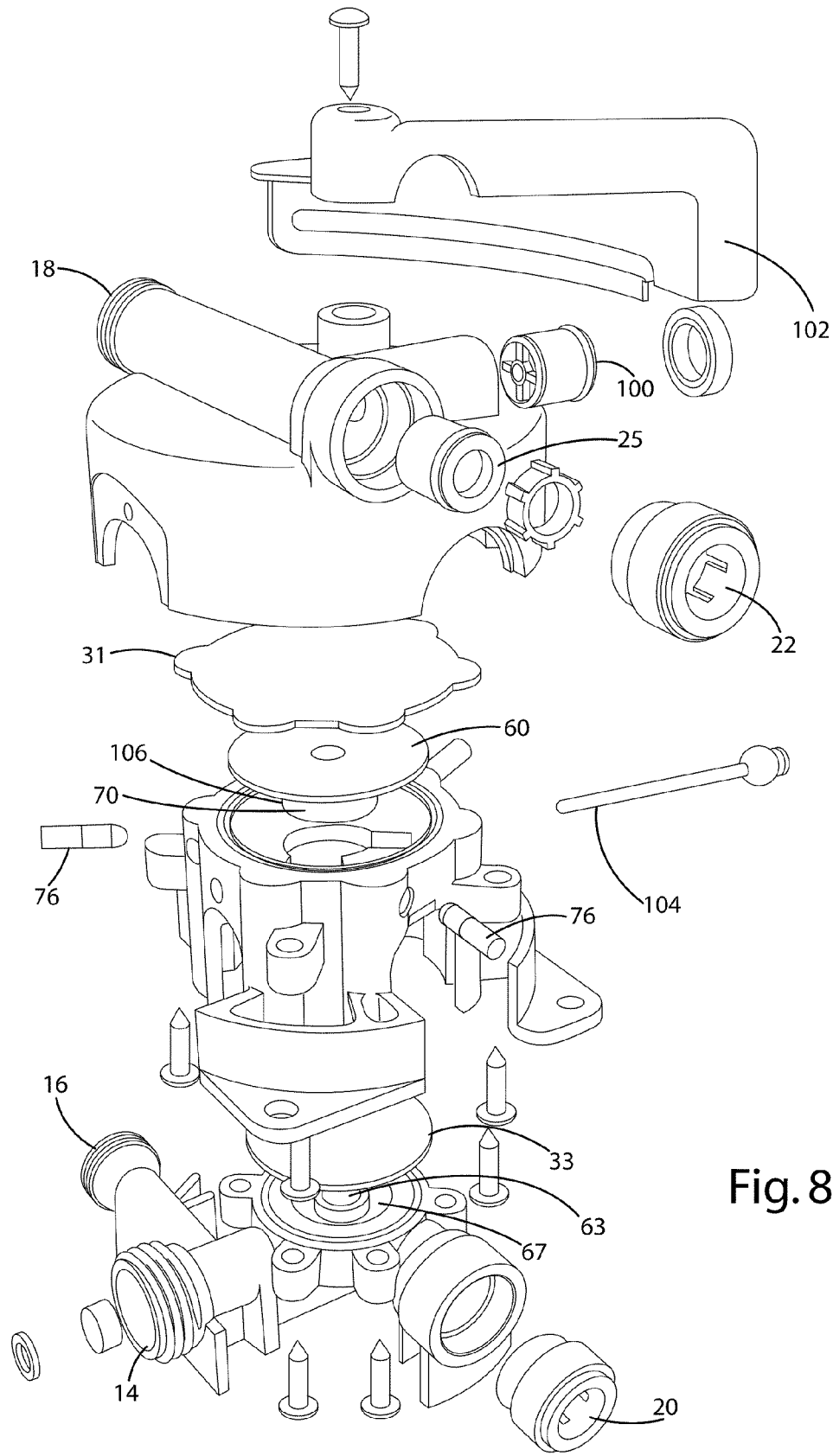
FIG. 8 is an exploded view of the valve system of FIG. 7.
Figure 9:
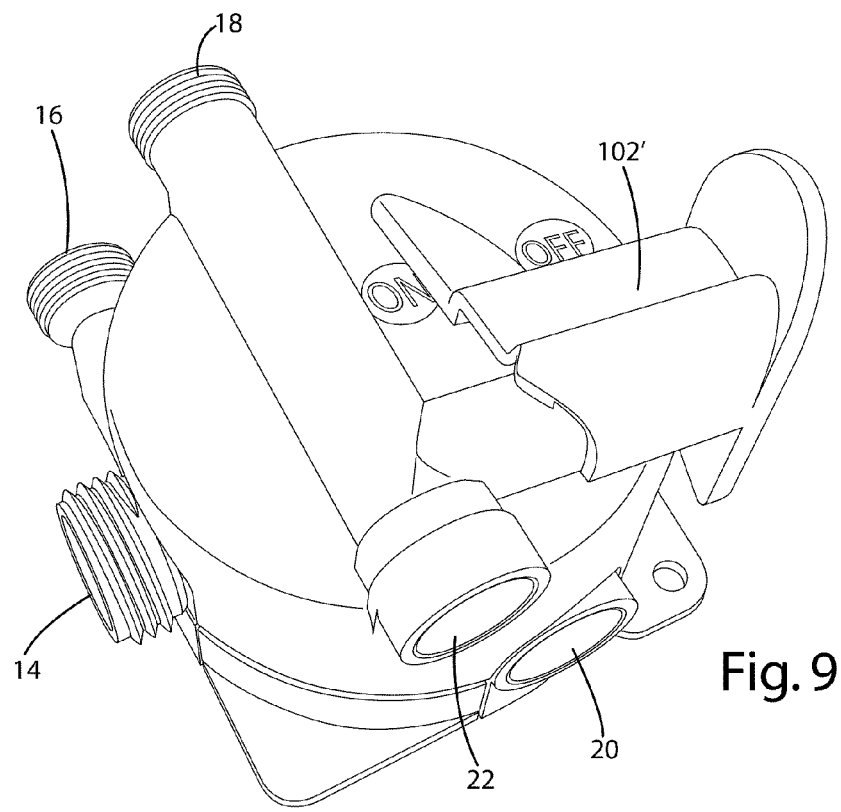
FIG. 9 is a perspective view of the valve system according to another embodiment.
Figure 10:
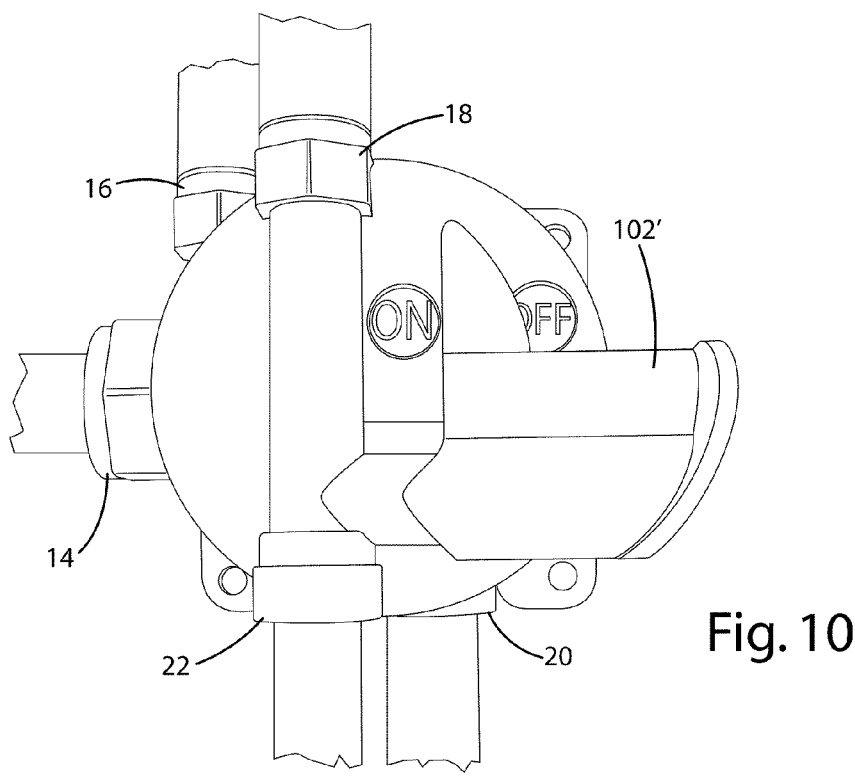
FIG. 10 is a top view of the valve system of FIG. 9 showing the supply lines connected to the valve system.
Figure 11:
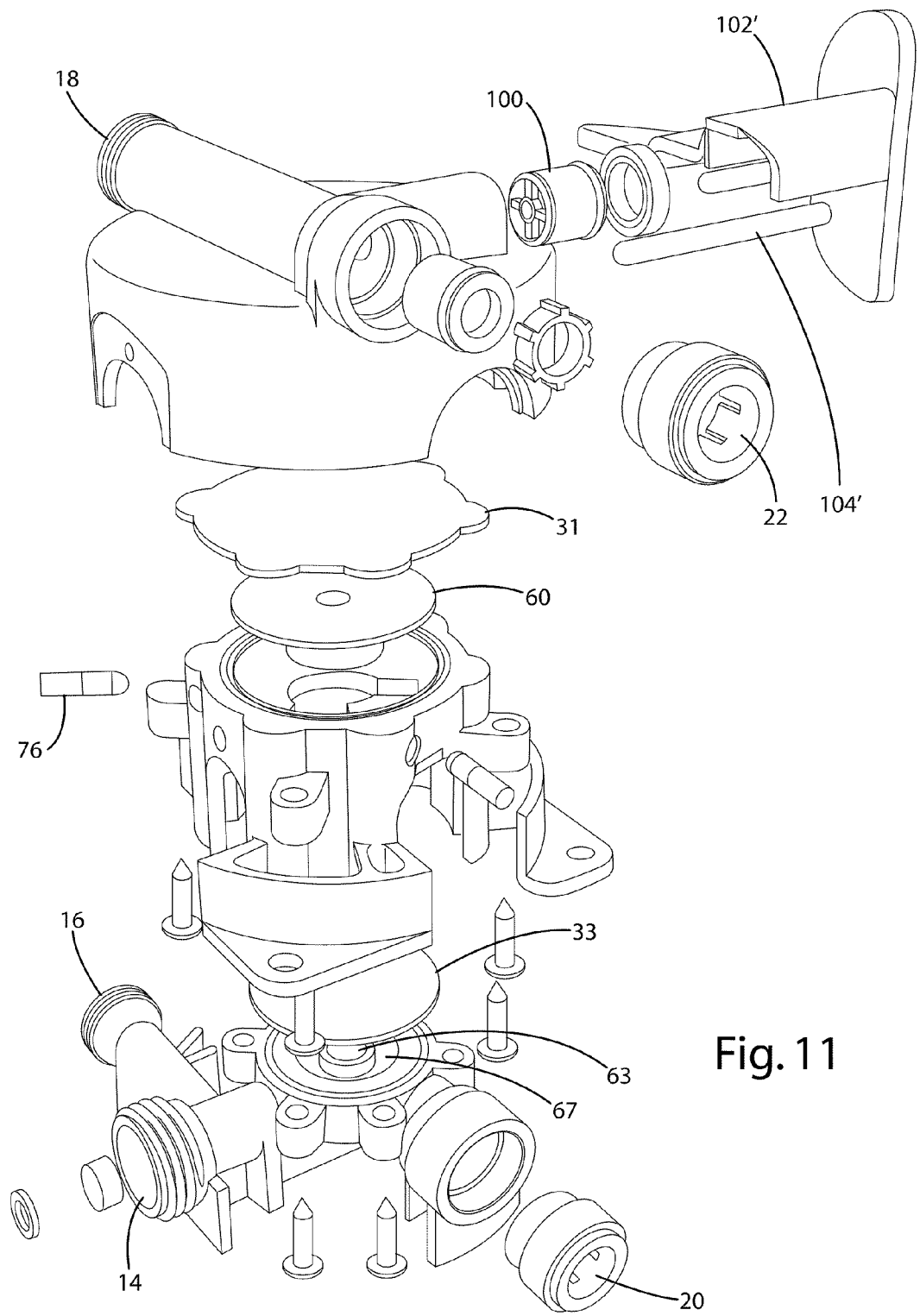
FIG. 11 is an exploded view of the outlet valve system of FIG. 9.

Alternative embodiments of the valve system are shown in FIGS. 7-8 and in FIGS. 9-11. These alternative embodiments operate in the same manner and with the same basic components as in the above described embodiment, except that the alternative embodiments include a switch for locking the valve system closed and a pressure relief system. FIGS. 7-8 show a pivoting switch 102 that engages a pin 104. The pin 104 extends through a hole (not shown) in the housing 12, and, when closed, it extends through a hole 106 in the plunger base 70 to lock the plunger 60 in the closed position. FIGS. 9-11 show a sliding switch 102' that includes a pin 104' that operates in the same manner as the pin 104. The locking mechanism can be used to prevent the plunger 60 from opening, even when the faucet 30 is turned on. This can prevent unwanted flow of water from the valve system 10, such as in situations when maintenance is being performed on the water treatment system 11. FIGS. 8 and 11 show a pressure relief system 100 that relieves the pressure in the water treatment system 11 when the faucet 30 is closed.

Although the valve system 10 is described above in connection with a water treatment system 11 that includes one or more filters for treating water, the valve system 10 may be used in connection with other devices that operate on a supply of fluid, such as a hot water heater, a water softener, beverage vending machines, drinking fountains, refrigerator ice and water dispensers, food processing equipment, air filter systems, hydraulic systems and a variety of others. In this application, the valve system 10 can be placed in-line with the device and can operate as a pressure protector for these fluid flow devices to prevent catastrophic failure, such as flooding, in the event that the downstream device malfunctions and/or leaks. Many fluid flow devices react poorly to continuous high pressure situations, resulting in leakage, stress on components and seals, and the potential for catastrophic failure. The valve system 10 of the present invention can eliminate a standing high pressure condition on these devices, by only allowing high pressure to enter the fluid flow device when a dispenser (such as the faucet 30 in the above-illustrated embodiment) connected to the valve system outlet 18 is opened. In each application, the fluid flow device may connected to the device inlet 22 and the device outlet 20 in substantially the same way as the water treatment system 11 described above. For example, if the supply side of a hot water heater tank is connected to the valve system 10 via a first connector attached to the inlet 22 and a second connector attached to the outlet 20, then the hot water tank experiences a low pressure condition at all times that the shutoff valve 24 is in a closed position. The hot water tank remains in the low pressure condition until a dispenser (such as a faucet) connected to the housing outlet 18 is opened, whereby the reduction in pressure within the flow path between the outlet 20 and the outlet 18 causes the shutoff valve 24 to move to an open position to allow fluid to flow through the valve system 10 to the hot water tank. The hot water tank, or other fluid system, does not see sustained high pressure. As a result, devices connected to the valve system 10 may utilize components that are lighter, less expensive, and smaller, as they no longer have to withstand constant high pressure. In addition, because the supply fluid is prevented from flowing to the devices when the shutoff valve is closed, the devices can be taken offline for maintenance or adjustment without shutting off the supply fluid at its source.

In addition to the hot water tank example, other devices may utilize the valve system as a pressure protector in a similar manner. In a beverage vending machine application, the valve system 10 allows the carbonated water to be kept at a lower pressure than in current systems, resulting in a lower cost, lighter weight design. In a water softener system, the valve system 10 may be used to reduce the pressure on the softener components, and if a leak develops while the shutoff valve 24 is closed, the leak will be limited to the water in the system after the valve, preventing catastrophic flooding. A refrigerator commonly includes a water dispenser/chiller and an ice maker, both of which are connected to a water supply, which may be at a high pressure. As a result, the refrigerator components must be designed to withstand use in a high pressure environment, even if it is not present. By installing the valve system 10 at the supply connect point, the refrigerator components may be downsized to a lower pressure standard, reducing weight, cost, and complexity. In food processing, such as dairy production, use of the valve system allows for components beyond the valve to be constructed of lighter materials at lower cost. Storage tanks in the process chain can be maintained at a lower storage pressure, allowing for thinner tank walls.

In one embodiment, the valve system 10 may be used to protect the components of a dispenser from pressure—without having a fluid flow device connected between the device outlet 20 and device inlet 22. In this embodiment, a simple hose connector or the like may directly connect the device outlet 20 to the device inlet 22. This embodiment may be useful in many situations where the dispenser includes one or more components that would benefit from being relieved from constant high pressure. For example, air compressor systems, such as those used in repair garages, generally feature at least one air compressor connected to a number of supply lines which distribute compressed air around a building or work area. The valve system 10, installed after the air compressor, allows for a lower line pressure to be maintained throughout the network of compressed air lines and dispensers (i.e., nozzles). If the network requires service, components can be removed easily without emptying the air stored in the system. A similar arrangement may be used for a hydraulic system, such as in construction equipment. The valve system will prevent the system from emptying due to a disconnect for service, or damage.

Figure 12:
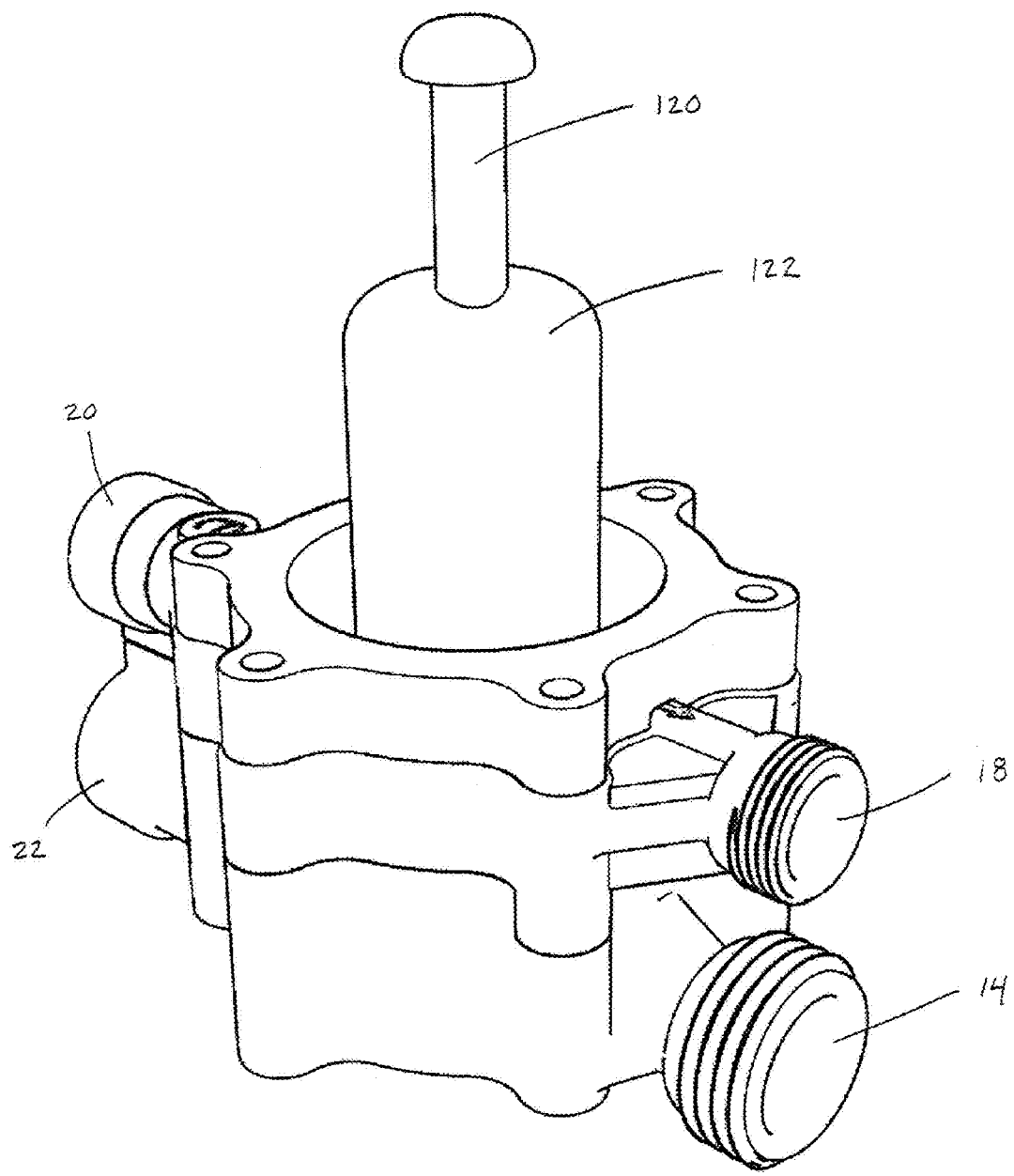
FIG. 12 is a perspective view of the valve system according to a second embodiment, wherein the valve system includes a second actuator.
Figure 13:
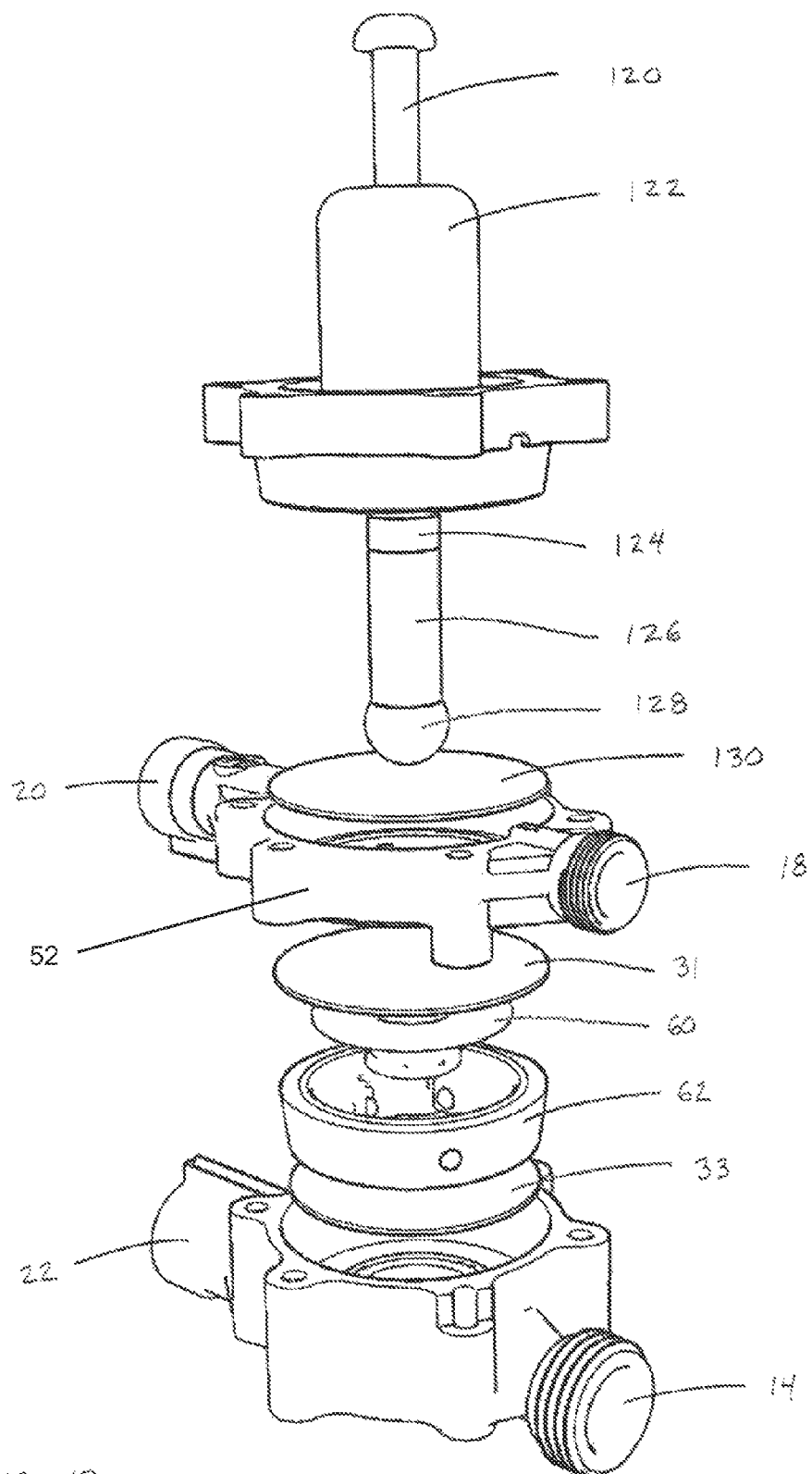
FIG. 13 is an exploded view thereof.
Figure 14:
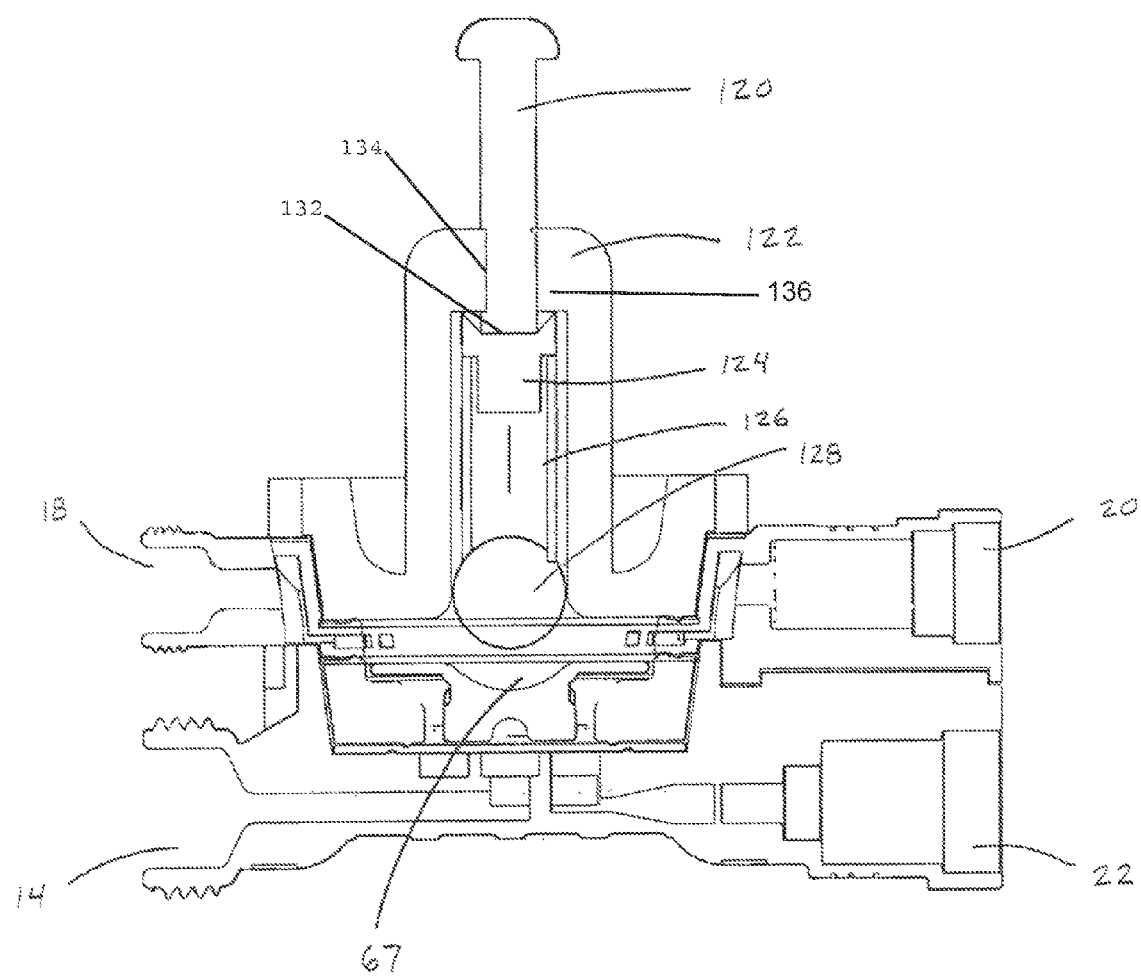
FIG. 14 is a side cross sectional view thereof.

In another embodiment, shown in FIGS. 12-14, the valve system 10 may include a second actuator 110 for moving the shutoff valve 24 between the open and closed positions—regardless of the ordinary operation of the shutoff valve 24. In other words, the second actuator 110 may be capable of overriding the ordinary operation of the shutoff valve 24 to move the shutoff valve 24 upon the occurrence of a predetermined event or series of events.

In the embodiment illustrated in FIGS. 12-14, the second actuator 110 includes a manually operated control rod 120 that may be pressed downwardly into a control rod housing 122 to force the plunger 60 downwardly toward the closed position. More particularly, the upper cap 50 may be replaced with the control rod housing 122, which is connected to the upper body member 52. A third membrane 130 may be positioned within the upper body member 52, above the upper membrane 31, forming a flow path between the membranes 130 and 31 for water entering the housing through the device inlet 22 and exiting through the valve system outlet 18. As shown in FIGS. 13 and 14, the control rod housing 122 seats within the upper body member 52 on top of the membrane 130 to hold the membrane 130 in place. As shown, the control rod housing 122 is generally cylindrical, with an internal opening that houses the control rod 120, a portion of a plunger ball 128, a spring 126 and a spring seat 124. The lower end 132 of the control rod extends through an opening 134 in the upper end 136 of the control rod housing 122 and engages the spring seat 124. The spring 126—which may be a coil spring or a resilient material—extends between the spring seat 124 and the plunger ball 128. The plunger ball 128, which is held in place by the control rod housing 122 and the spring 126, rests on the top surface of the third membrane 130. The resiliency in the membrane 130 holds the plunger ball 128 away from the plunger 60 when no external forces are acting on the control rod 120. The spring 126 biases the control rod 120 in a raised position.

In operation, the control rod 120 can be manually pressed by a user, such that the control rod 120 extends into the control rod housing 122. As the control rod 120 extends into the housing 122, it forces the spring seat 124, spring 126 and plunger ball 128 downwardly such that the plunger ball 128 flexes the membrane 130 and ultimately displaces the plunger 60 to move the plunger 60 toward the closed position. When the control rod 120 is fully depressed, the plunger ball 128 fits into a plunger seat 67 in the plunger 60 to hold the plunger 60 in the fully closed position. In this way, the second actuator 110 can be operated to partially or completely closed the shutoff valve 24 regardless of the pressure differential between the fluid flow above and below the plunger 60.

In another embodiment, the second actuator 110 may be automatically operated, for instance, with a solenoid (not shown) or another electromechanical actuator. The solenoid may be electrically connected to a conventional controller (not shown) that is configured to signal the solenoid to actuate, and thus move the plunger 60 partially or completely to the closed position. The solenoid or other electromechanical actuator may additionally be electrically connected to one or more sensors (not shown) that can detect a particular occurrence and signal the controller or the electromechanical actuator to move as a result of that occurrence. A variety of sensors may be used. A moisture sensor may be used to detect a leak downstream from the valve system 10, such that the second actuator 110 is signalled to immediately close the shutoff valve 24 upon a detection of a leak to prevent additional fluid flow beyond the valve system 10. A temperature sensor may be used to detect an overheating fluid flow device or a fire and thus close the shutoff valve 24. A pressure sensor or flow meter can be used to monitor the pressure or the amount of fluid flow between the valve system 10 and the dispenser, or in a separate fluid flow system, and to signal the second actuator 110 to close the shutoff valve 24 in response to an unwanted pressure situation or to partially close the shutoff valve 24 to regulate the amount of flow passing from the valve system 10 to the dispenser.

Figure 15:
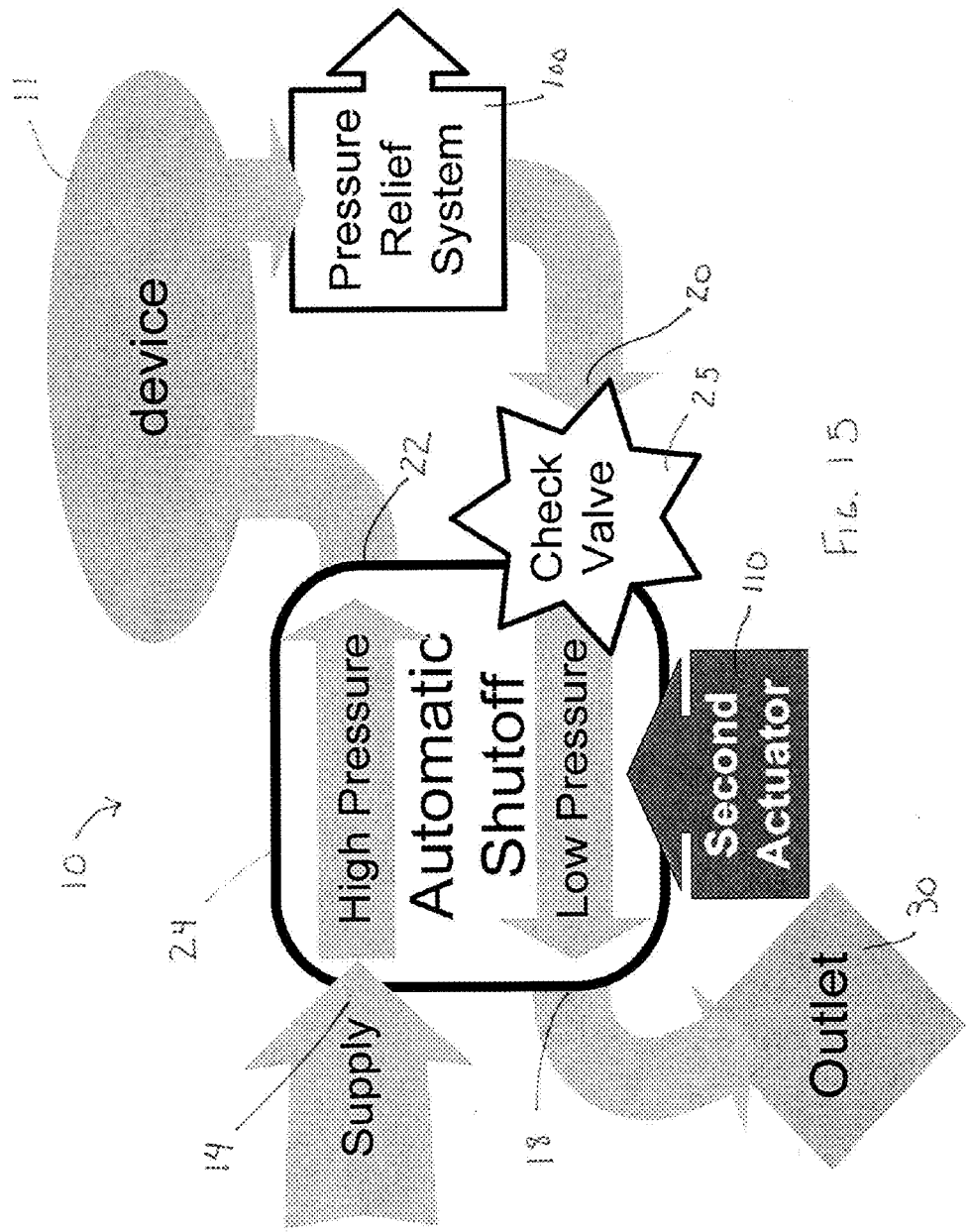
FIG. 15 is a schematic flow diagram according to the second embodiment.
Figure 16:
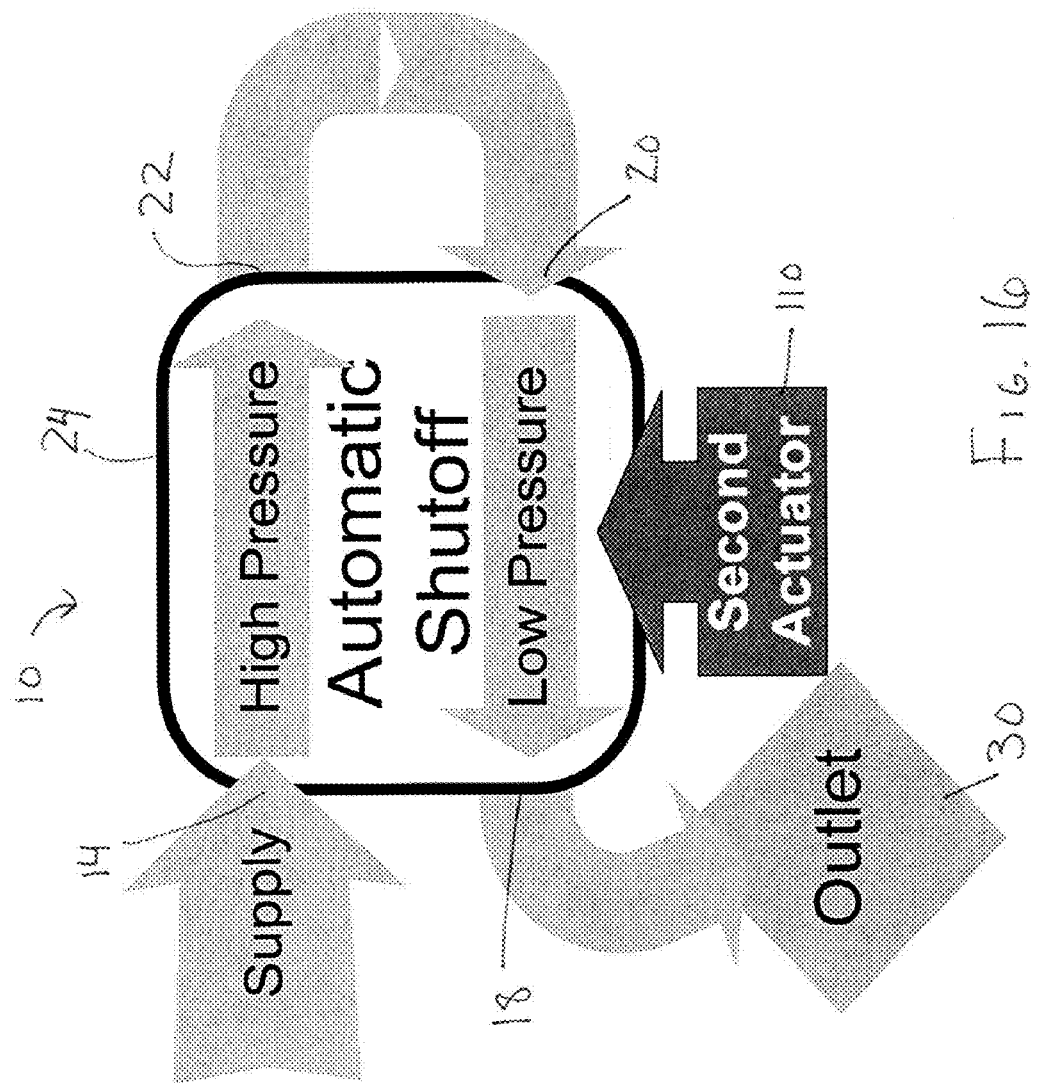
FIG. 16 is another schematic flow diagram according to the second embodiment.
Figure 17:
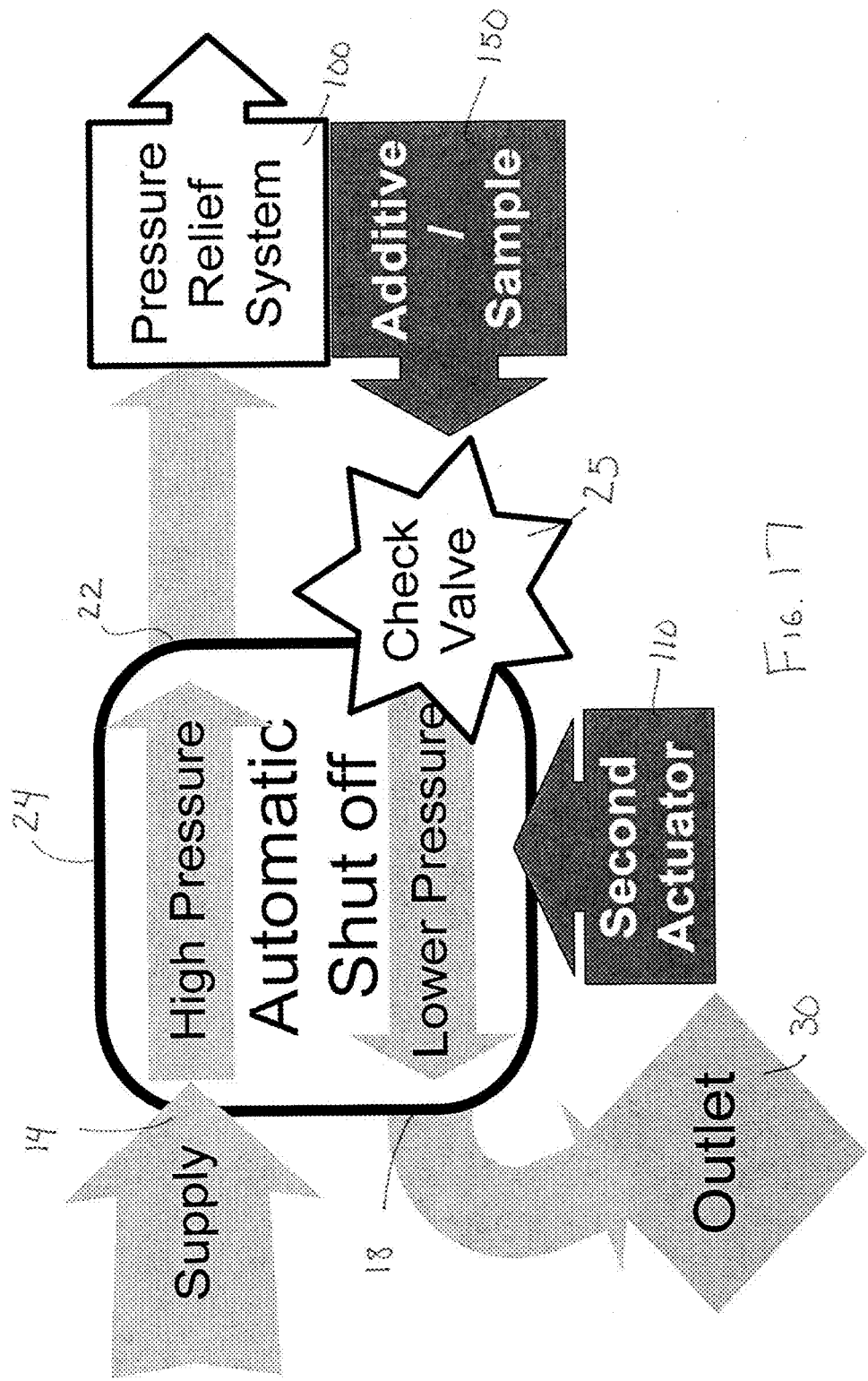
FIG. 17 is another schematic flow diagram according to the second embodiment.

FIGS. 15-17 show schematic views of the valve system 10 including a second actuator 110. FIG. 15 shows a schematic that includes a fluid flow device 11, such as a water treatment system or hot water tank, connected between the device outlet 20 and the device inlet 22, with a pressure relief system 100 in fluid communication with the device 11. In this embodiment, the valve system 10 acts as a pressure protector for the device 11 because the device 11 is held at a low pressure when the shutoff valve 24 is closed. The second actuator 110 enables the device 10 to additionally shut down or regulate fluid flow to the device 11 and the dispenser 30 or "outlet" as described above. As described above, the second actuator 110 may be manual or automatic, and it may be configured to operate in response to a signal from a sensor capable of detecting a predetermined event.

FIG. 16 is a schematic showing an arrangement without a fluid flow device 11 connected between the outlet 20 and inlet 22. Instead, the inlet 22 and outlet 20 are directly connected such that fluid flowing out of the device outlet 20 flows directly into the device inlet 22. In this embodiment, the valve system 10 can protect a dispenser 30 or "outlet," or a variety of fluid flow devices that may be connected to the valve system outlet 18 (i.e., downstream from the valve system 10) from unwanted pressure. The dispenser or fluid flow device experiences low pressure while the dispenser or the device are turned off. As soon as the dispenser is opened or the device is turned on, the pressure at the valve system outlet 18 drops, causing the shutoff valve 24 to open. Similar to the embodiment described above, the second actuator 110 enables the device 10 to shut down or regulate fluid flow to the dispenser independent from the pressure differential within the shutoff valve.

FIG. 17 shows a schematic of yet another embodiment wherein the valve system 10 is used to enable the addition of an additive into the fluid stream. The line in 150 for the additive is positioned between the device outlet 20 and the device inlet 22, and after a pressure relief mechanism 100. The line in 150 can therefore be connected and disconnected to the system at any time that the dispenser is closed. When the dispenser is opened, fluid flows past the line in 150 to allow the additive to be inserted. The second actuator 110 can be used to shut off flow to the dispenser (manually or automatically) or to regulate the flow. One application for this embodiment is in connection with a medication stream flowing into a patient's intravenous drip. A medication can be added to the line at any time that the flow downstream from the valve system 10 is shutoff, without the need to shut off the supply line entering the system.

The above description is that of the current embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

What is claimed is:

1. A valve system for protecting a fluid flow device from pressure comprising:
   a housing;
   a first flow path extending through said housing, said first flow path including a first inlet and a first outlet, said first outlet in fluid communication with the fluid flow device;
   a second flow path extending through said housing, said second flow path including a second inlet and a second outlet, said second inlet in fluid communication with the fluid flow device;
   a check valve, wherein said check valve prevents fluid flow from said housing through said second inlet;
   a shutoff valve within said housing capable of being switched between an open position and a closed position, said open position allowing fluid flow through said first flow path and said second flow path, said closed position prohibiting fluid flow through said first flow path; and
   a second actuator connected to said shutoff valve, said second actuator capable of moving said shutoff valve to the closed position.

2. The valve system of claim 1 including a pressure relief mechanism in fluid communication with said housing and the fluid flow device for relieving pressure from said fluid flow device.

3. The valve system of claim 1 wherein a pressure differential is defined between a first pressure within said first flow path and a second pressure within said second flow path, said shutoff valve switched between said open position and said closed position as a function of said pressure differential.

4. The valve system of claim 3 wherein said second outlet is in fluid communication with a dispenser, said dispenser including an open position in which fluid is capable of flowing through said dispenser and a closed position in which fluid is prevented from flowing through said dispenser.

5. The valve system of claim 4 wherein movement of said dispenser from said closed position to said open position changes said pressure differential such that said shutoff valve moves from said closed position to said open position.

6. A valve system for protecting a fluid flow device from pressure comprising:
   a housing;
   a first flow path extending through said housing, said first flow path including a first inlet and a first outlet, said first outlet in fluid communication with the fluid flow device;
   a second flow path extending through said housing, said second flow path including a second inlet and a second outlet, said second inlet in fluid communication with the fluid flow device;
   a check valve, wherein said check valve prevents fluid flow from said housing through said second inlet;
   a shutoff valve within said housing capable of being switched between an open position and a closed position, said open position allowing fluid flow through said first flow path and said second flow path, said closed position prohibiting fluid flow through said first flow path;
   a second actuator connected to said shutoff valve, said second actuator capable of moving said shutoff valve; and
   a sensor connected to said second actuator, said sensor capable of sending a signal to said second actuator, said signal operating said second actuator to move said shutoff valve,
   wherein a pressure differential is defined between a first pressure within said first flow path and a second pressure within said second flow path, said shutoff valve switched between said open position and said closed position as a function of said pressure differential,
   wherein said second outlet is in fluid communication with a dispenser, said dispenser including an open position in which fluid is capable of flowing through said dispenser and a closed position in which fluid is prevented from flowing through said dispenser,
wherein movement of said dispenser from said closed position to said open position changes said pressure differential such that said shutoff valve moves from said closed position to said open position.

7. The valve system of claim 6 wherein said sensor is configured to detect at least one of temperature, moisture and pressure.

8. A method for operating a valve system comprising:
providing a housing defining a first flow path and a second flow path;
providing a shutoff valve within said housing, said shutoff valve operable to move between an open position allowing fluid flow through said first flow path and said second flow path and a closed position preventing fluid flow through said first flow path;
connecting a fluid supply to said first flow path;
connecting said first flow path to said second flow path;
moving said shutoff valve as a function of the pressure differential between said first flow path and said second flow path; and
providing a second actuator connected to said housing; and
moving said shutoff valve to the closed position with said second actuator.

9. The method of claim 8 including connecting said second flow path to a dispenser that can be opened and closed.

10. The method of claim 9 wherein the opening of the dispenser causes the pressure differential between said first flow path and said second flow path to change and moves said shutoff valve.

11. A method for operating a valve system comprising:
providing a housing defining a first flow path and a second flow path;
providing a shutoff valve within said housing, said shutoff valve operable to move between an open position allowing fluid flow through said first flow path and said second flow path and a closed position preventing fluid flow through said first flow path;
connecting a fluid supply to said first flow path;
connecting said first flow path to said second flow path;
moving said shutoff valve as a function of the pressure differential between said first flow path and said second flow path; and
providing a second actuator connected to said housing;
moving said shutoff valve with said second actuator;
connecting said second flow path to a dispenser that can be opened and closed; and
connecting a sensor to said second actuator, said sensor sending a signal to said second actuator upon said sensor detecting at least one of a change in moisture levels, a change in temperature, a change in mechanical position, and a change in pressure, said second actuator moving said shutoff valve upon receiving said signal;
wherein the opening of the dispenser causes the pressure differential between said first flow path and said second flow path to change and moves said shutoff valve.

12. The method of claim 11 wherein said shutoff valve is moved completely to said closed position upon said sensor sensing a change in moisture.

13. The method of claim 11 wherein said shutoff valve is moved partially toward said closed position upon said sensor sensing a change in pressure within said second flow path.

14. The method of claim 10 including connecting said first flow path and said second flow path to a fluid flow device, opening said dispenser to move said shutoff valve to said open position to allow fluid to flow from said first flow path to said fluid flow device, and closing said dispenser to move said shutoff valve to the closed position to prevent fluid flow to said device.

15. A valve system comprising:
a valve housing defining a first flow path having a first inlet and a first outlet, and a second flow path having a second inlet and a second outlet, said valve housing including a shutoff valve within said housing, said shutoff valve capable of moving between an open position in which fluid can flow through said first flow path and said second flow path and a closed position in which fluid is prevented from flowing through said first inlet, said shutoff valve moving from said open position to said closed position as a function of the pressure differential between said first flow path and said second flow path; and
a second actuator connected to said housing, said second actuator including a drive element operably connected to said shutoff valve such that movement of said drive element causes movement of said shutoff valve to the closed position.

16. The valve system of claim 15 including a fluid flow device in fluid communication with said first flow path and said second flow path, a check valve positioned between said fluid flow device and said second flow path, said check valve preventing fluid flow from said second inlet to said fluid flow device, and a pressure relief mechanism in fluid communication with said fluid flow device, said pressure relief mechanism venting fluid pressure from said fluid flow device when said shutoff valve is in said closed position.

17. A valve system comprising:
a valve housing defining a first flow path having a first inlet and a first outlet, and a second flow path having a second inlet and a second outlet, said valve housing including a shutoff valve within said housing, said shutoff valve capable of moving between an open position in which fluid can flow through said first flow path and said second flow path and a closed position in which fluid is prevented from flowing through said first inlet, said shutoff valve moving from said open position to said closed position as a function of the pressure differential between said first flow path and said second flow path;
a second actuator connected to said housing, said second actuator including a drive element operably connected to said shutoff valve such that movement of said drive element causes movement of said shutoff valve; and
a sensor connected to said second actuator, said sensor capable of sending a signal to said second actuator upon a predetermined occurrence, said second actuator operable to move upon receiving said signal.

18. The valve system of claim 17 wherein said sensor is at least one of a pressure sensor, a temperature sensor, a position sensor, and a moisture sensor.

19. The valve system of claim 15 wherein said second actuator includes a control rod and a plunger, said control rod movable between a first position and a second position, wherein movement of second control rod to said second position drives said plunger to move said shutoff valve to said closed position.

* * * * *